United States Patent
Sato et al.

(10) Patent No.: US 6,888,335 B2
(45) Date of Patent: May 3, 2005

(54) METHOD AND SYSTEM FOR CONTROLLING VEHICLE DOOR POSITION IN RESPONSE TO DETECTION OF ABNORMAL OPERATION

(75) Inventors: Yoshinobu Sato, Nagano (JP); Hiroshi Takahashi, Nagano (JP)

(73) Assignee: Fuji Electric Systems Co., Ltd., Toyko (JP)

( * ) Notice: Subject to any disclaimer, the term of this patent is extended or adjusted under 35 U.S.C. 154(b) by 0 days.

(21) Appl. No.: 10/779,861

(22) Filed: Feb. 18, 2004

(65) Prior Publication Data

US 2004/0251868 A1 Dec. 16, 2004

(30) Foreign Application Priority Data

Jun. 10, 2003 (JP) ........................................ 2003-165424

(51) Int. Cl.[7] .................................................. G05B 1/06
(52) U.S. Cl. ....................... 318/652; 318/466; 318/468; 318/452; 49/360
(58) Field of Search ................................ 318/652, 466, 318/468, 452; 49/118, 360

(56) References Cited

U.S. PATENT DOCUMENTS

| | | | | |
|---|---|---|---|---|
| 4,006,392 A | * | 2/1977 | Catlett et al. ............... | 318/266 |
| 4,142,326 A | * | 3/1979 | Schmitz ........................ | 49/118 |
| 4,383,206 A | * | 5/1983 | Matsuoka et al. ........... | 318/445 |
| 5,226,370 A | * | 7/1993 | Templeton et al. .......... | 105/341 |
| 5,789,887 A | * | 8/1998 | Elischewski ................. | 318/468 |
| 6,729,071 B1 | * | 5/2004 | Kawanobe et al. ........... | 49/360 |

FOREIGN PATENT DOCUMENTS

| | | |
|---|---|---|
| JP | 05-098867 | 4/1993 |
| JP | 05-344775 | 12/1993 |

* cited by examiner

Primary Examiner—Rita Leykin
(74) Attorney, Agent, or Firm—Rabin & Berdo, P.C.

(57) ABSTRACT

A method and system for controlling vehicle door position in improved reliability of a vehicle door electromechanical positioning components. The vehicle door control system includes an abnormality detector for detecting abnormal operation of the vehicle door by a deviation of expected door position and/or velocity. If abnormal operation is detected, operation of the electrical motor driving the door is ceased for a predetermined time period. Operation is then resumed if the abnormal condition has been removed. The control system may include a counter for counting a number of attempts to resume operation and further attempts to resume may be ceased if the counter exceeds a predetermined count value. The motor or door positioning system may include a locking device that locks the vehicle door at various positions and the control system use indications of a locked position indicator to determine whether or not to resume operation of the electric motor.

20 Claims, 5 Drawing Sheets

METHOD AND SYSTEM FOR CONTROLLING VEHICLE DOOR POSITION IN RESPONSE TO DETECTION OF ABNORMAL OPERATION

BACKGROUND OF THE INVENTION

1. Field of the Invention

The present invention relates generally motor control systems, and more specifically to a vehicle door control system that detects and responds to abnormal door operation.

2. Background of the Invention

Automatic vehicle door opening and closing mechanisms are in widespread use in public transportation systems such as trains and buses, as well as in private vehicles adapted for use by the handicapped. The control of the operation of a vehicle door is typically performed by an electronic control system that determines the position and speed of a moving element of an electric motor that operates the door positioning mechanism. The control system typically stops the electric motor when an abnormality is detected in the operation of the door positioning mechanism by observing position and speed signals from a position detector coupled to the motor and/or positioning mechanism. The control system responds to the detection of the abnormality by removing power from the electric motor in order to prevent breakage of the positioning mechanism, the vehicle door or damage to the electric motor.

Japan Patent Application JP-A-5-344775 discloses a vehicle door control system that provides a signal that is generated when abnormal position or speed of the positioning system is detected. The signal causes the servo motor to stop operating. Japan Patent Application JP-A-5-98867 discloses a vehicle door control system that restricts operation of an electric motor that moves a vehicle door for a predetermined time period when abnormal operation is detected. In both of the systems described in the above-referenced patent applications, the electric motor is ultimately stopped when abnormal operation is detected.

In addition to detecting abnormal door/door positioner operation, indications of continuous abnormal operation in the above-mentioned systems occur when a disconnection or failure of a feedback signal from the position detector occurs and indications of temporary abnormal operation occur when electrical noise is present on the position detector feedback signal(s), such noise due to electrical storms or electrical noise generated by operation of the electric motor. In either case, if the electric motor is controlled in position and speed in conformity with an erroneous feedback signal, the electric motor, positioning system and/or the vehicle door may be damaged. Therefore, in the above-mentioned control systems, operation of the electric motor is stopped in order to prevent damage.

However, stopping operation of a vehicle door control system when no actual possibility of damage exists is undesirable, as delays or complete shutdown prevent the use of the vehicle door and in public transportation applications, prevent persons from entering or exiting the vehicle.

Therefore, it would be desirable to provide a vehicle door control system and method whereby operation of the vehicle door may be continued after detection of an abnormality if a determination is made that the vehicle door control mechanism may be damaged or broken, while preventing operation that may cause damage to the vehicle door, door positioning mechanism or the electric motor.

SUMMARY OF THE INVENTION

The above objectives of providing for continued operation of a vehicle door control system after detection of an abnormality if a determination is made that the vehicle door, positioning system or electric motor will not be damaged is accomplished in a method and system for controlling a vehicle door position.

The system is an electronic control system coupled to an electric motor that operates the vehicle door and is further coupled to an abnormality detector that determines when the position and/or velocity of the door indicates that operation of the door is abnormal. The system further includes a control circuit coupled to the abnormality detector that ceases operation of the electric motor when abnormal operation is detected and resumes operation after a predetermined amount of time has elapsed if the abnormality is no longer present. The control circuit may further include a counter for counting a number of times that operation is resumed and cease resumption of operation if the number of attempts to resume operation exceeds a predetermined count value.

When the vehicle door positioning system or the electric motor include a locking device for locking the position of the vehicle door at one or more positions, the control system may further include a locked state detector for detecting that the vehicle door or motor is in one of the locked positions. The control circuit may be coupled to the locked state detector for storing an indication of the locked state position and may compare a position of a next locked state and cease operation of the electric motor if the magnitude of the difference exceeds a predetermined value.

The vehicle door control method is a method of operation of the above-described control system and may be embodied therein.

The foregoing and other objectives, features, and advantages of the invention will be apparent from the following, more particular, description of the preferred embodiment of the invention, as illustrated in the accompanying drawings.

DETAILED DESCRIPTION OF THE PREFERRED EMBODIMENTS

The present invention is directed toward an electronic control system and method for controlling the position of a vehicle door. The control system operates an electric motor that opens/closes the vehicle door, which may be a public transportation vehicle door such as on a train or bus, or may be an automobile door. The control system includes a detector for detecting the position and/or velocity of door via a detector mechanically coupled to the electric motor. The control system further includes an abnormality detector that determines when the position and/or velocity deviate from an expected position and/or speed. If an abnormality is detected, motor operation is ceased for a predetermined period of time determined by a timer in the control system and then the control system resumes operation of the electric motor if the abnormality detector indicates that the abnormality is no longer present. The control system thereby provides for continued operation when the abnormality is a transient abnormality, e.g., when noise or intermittent operation of the control system causes an indication of an abnormality. The control system also thereby provides for shutdown of the vehicle door positioning system when a continuous abnormality is indicated, e.g., when a disconnection of the motor speed/position feedback signal has occurred. The control system thus provides a means for providing continued vehicle door operation when there is no possibility of damaging the door, the electric motor or other portions of the door positioning mechanism.

Figure 1:
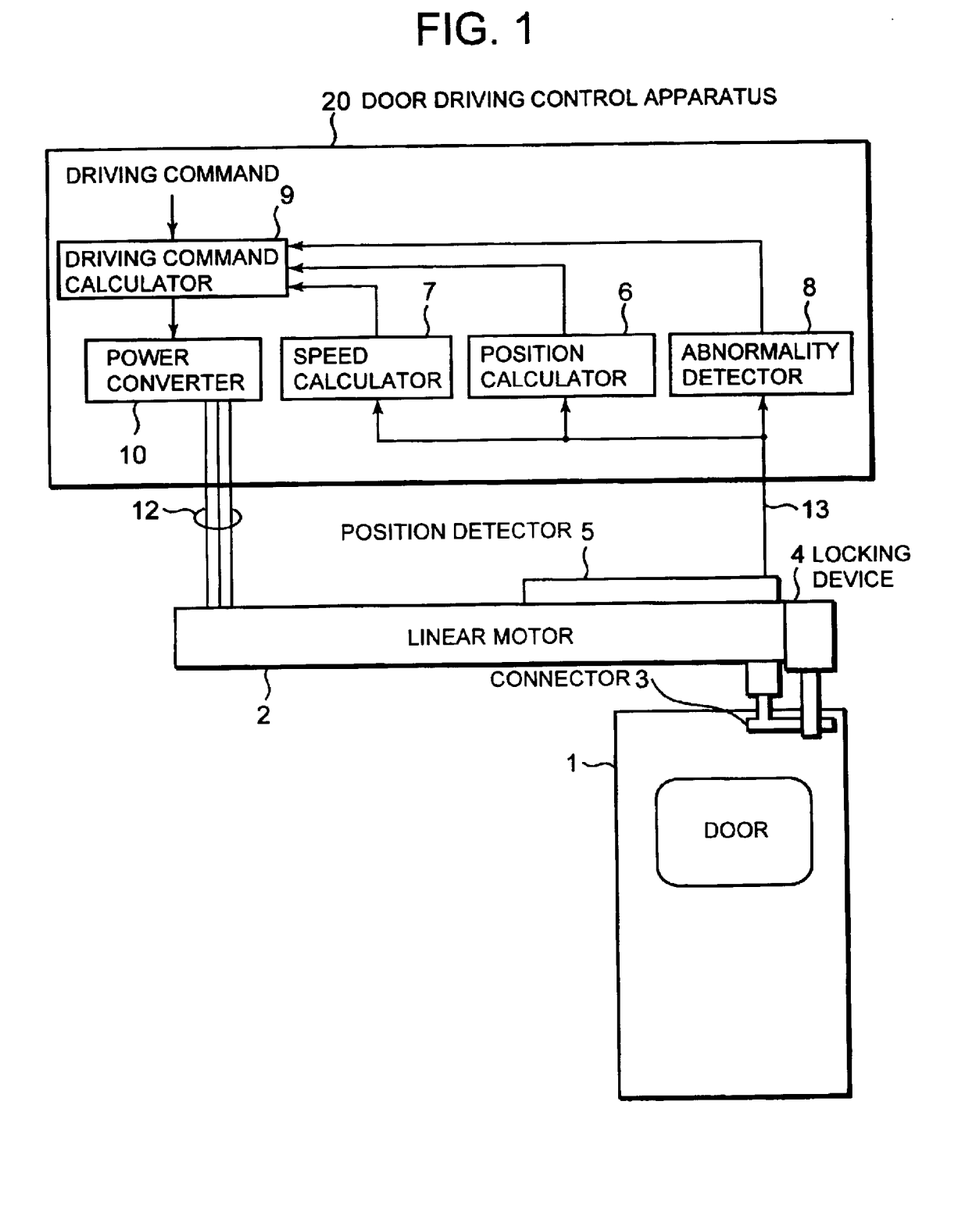
FIG. 1 is a block diagram depicting a vehicle door control system in accordance with an embodiment of the present invention.

Referring now to FIG. 1, a vehicle door control system 20 in accordance with an embodiment of the invention is shown. Control system 20 includes a position calculator 6, a speed calculator 7, an abnormality detector 8, a driving command calculator 9 and a power converter 10. Control system 20 is electrically connected via wiring 12 to a linear motor 2, which is mechanically coupled to door 1 in order to open and close door 1 and further electrically coupled via connection 13 to a position detector 5 for detecting the position of a moving part of linear motor 2.

Vehicle door 1 is mechanically connected to the moving part of the linear motor 2 by a connector 3, and a locking device 4 for mechanically fixing door 1 in one or more positions. Position detector 5 detects the position and/or velocity of the moving part the linear motor 2 and provides detection signals to position calculator 6, speed calculator 7 and abnormality detector 8 via connection 13. Position calculator 6 calculates the position of door 1 from the detection signal provided by position detector 5. Speed calculator 7 also calculates the opening and closing speed of door 1 from the detection signal.

Abnormality detector 8 provides an abnormality detection signal to driving command calculator 9 when an abnormality is detected. An abnormality is indicated by the detected position provided by position calculator 6 and/or speed calculated by speed calculator 7 based on the signals provided by position detector 5 have values that deviate values corresponding to the position and speed control values.

Driving command calculator 9 includes a timer, a serious failure flag, an abnormal state flag and an abnormality start flag and controls the timer and flags, in response to door position information calculated by the position calculator 6, door speed information calculated by the speed calculator 7 and abnormality indications provided by abnormality detector 8. Driving command calculator determines driving commands for door 1 thereby controlling power converter 10 for controlling power supplied to linear motor 2. Power converter 10 supplies power to linear motor 2 in accordance with a power supply command calculated by driving command calculator 9.

Figure 2:
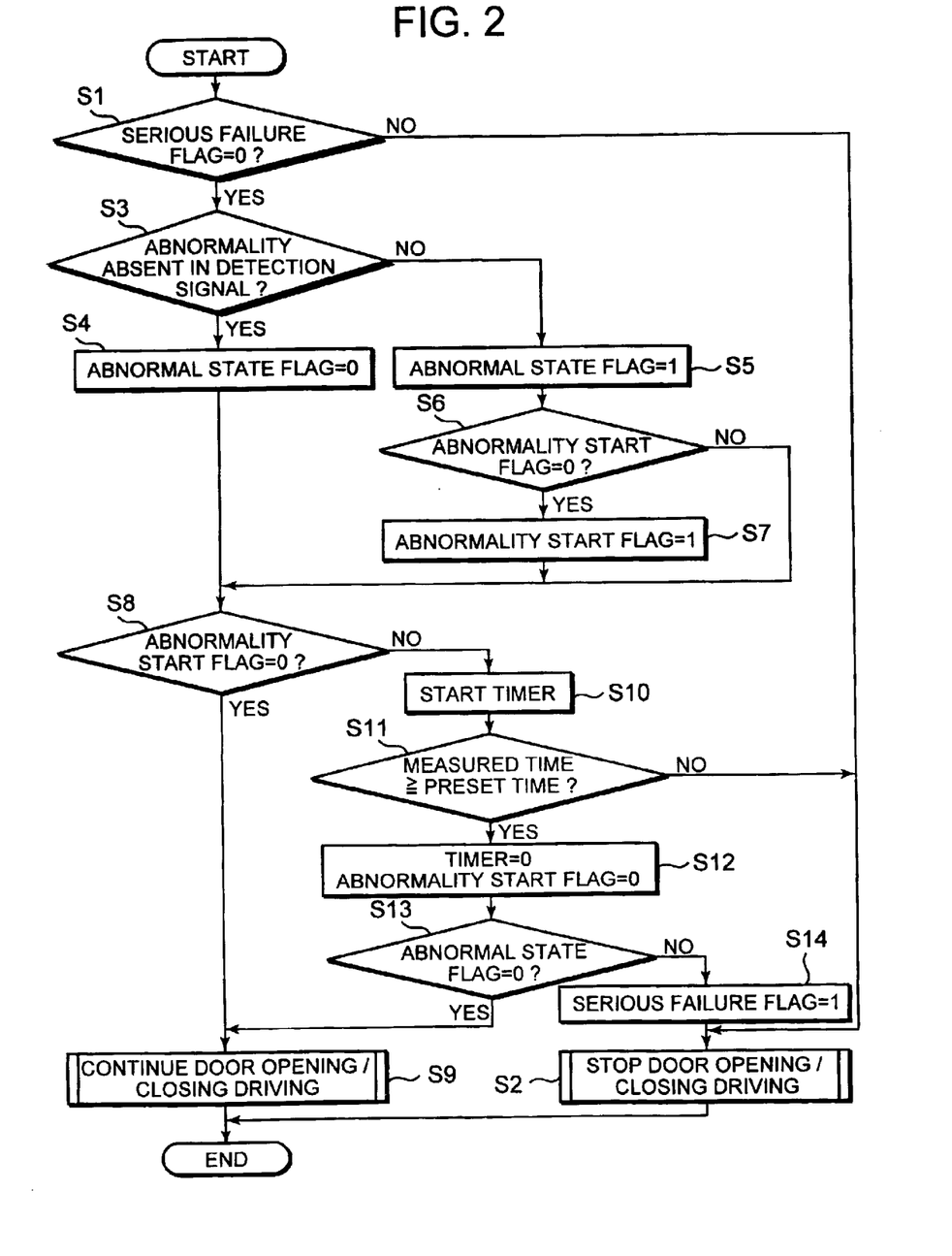
FIG. 2 is a flowchart depicting a method in accordance with an embodiment of the present invention.

Next, a method for controlling opening closing door 1 as performed by door control system 20 will be described with reference to the flowchart shown in FIG. 2. First, at step S1, driving command calculator 9 determines whether the serious failure flag is set (logical 1) or not (logical 0). If the serious failure flag is set (due to a previous abnormal condition exceeding a predetermined period of time, for example, due of disconnection of electrical connection 13), then the opening/closing driving of door 1 is stopped at step S2. Door 1 is stopped by sending a power supply command to stop the linear motor 2, which is sent to power converter 10. Otherwise, if the serious failure flag is not set, then abnormality detector 8 determines whether or not an abnormal condition exists in the position signal provided by position detector 5 (step S3). If no abnormality is present, the abnormal state flag is reset to "0" at step S4. If there is an abnormality in the detection signal, the abnormal state flag is set to "1" at step S5. Then, step S6 determines whether or not the abnormality start flag is set and if not, step S7 sets the abnormality start flag.

Next, the abnormality start flag is tested at step S8. If the abnormality start flag is not set, normal opening/closing of door 1 is continued at step S9, by sending a power supply commands sent to power converter 10 that cause linear motor 2 to operate at an opening/closing speed corresponding to the opening/closing position of door 1.

If the abnormality start flag is set at step S8, a timer is started at step S10 and at step S11 it is determined whether or not the measured time of the timer has reached a predetermined time period. If the predetermined time has not been reached, opening/closing of door 1 is stopped at step S12. If the predetermined time has been reached, the timer is reset (=0) and the abnormality start flag is reset to "0" at step S12. Then, the abnormal state flag is tested in step S13. If the abnormal state flag is not set, opening/closing operation of door 1 is continued at step S9. However, if the abnormal state flag is set, the serious failure flag is then set at step S14 and the opening/closing of door 1 is stopped at step S2.

By the above-described action, in the vehicle control system of FIG. 1, when an abnormality in the detection signal provided by position detector 5 is detected by abnormality detector 8, driving command calculator 9 stops the movement of door 1. If the abnormality is still detected after the lapse of a predetermined time from when the abnormality was initially detected, the stopped state is maintained. But, if the abnormality is no longer detected, opening/closing operation of door 1 is resumed.

Thus, if the abnormality is eliminated after the lapse of a predetermined time, it is determined that the abnormality is a temporary malfunction of position detector 5 or a minor transient fault and that there is no possibility of damage or breakage of linear motor 2 and the devices driven by linear motor 2. Therefore, opening/closing operation of the door is resumed and can be continuously carried out. Therefore, inconvenience due to the fault such as delay in getting on/off a vehicle and operation of the vehicle can be eliminated in general.

Figure 3:
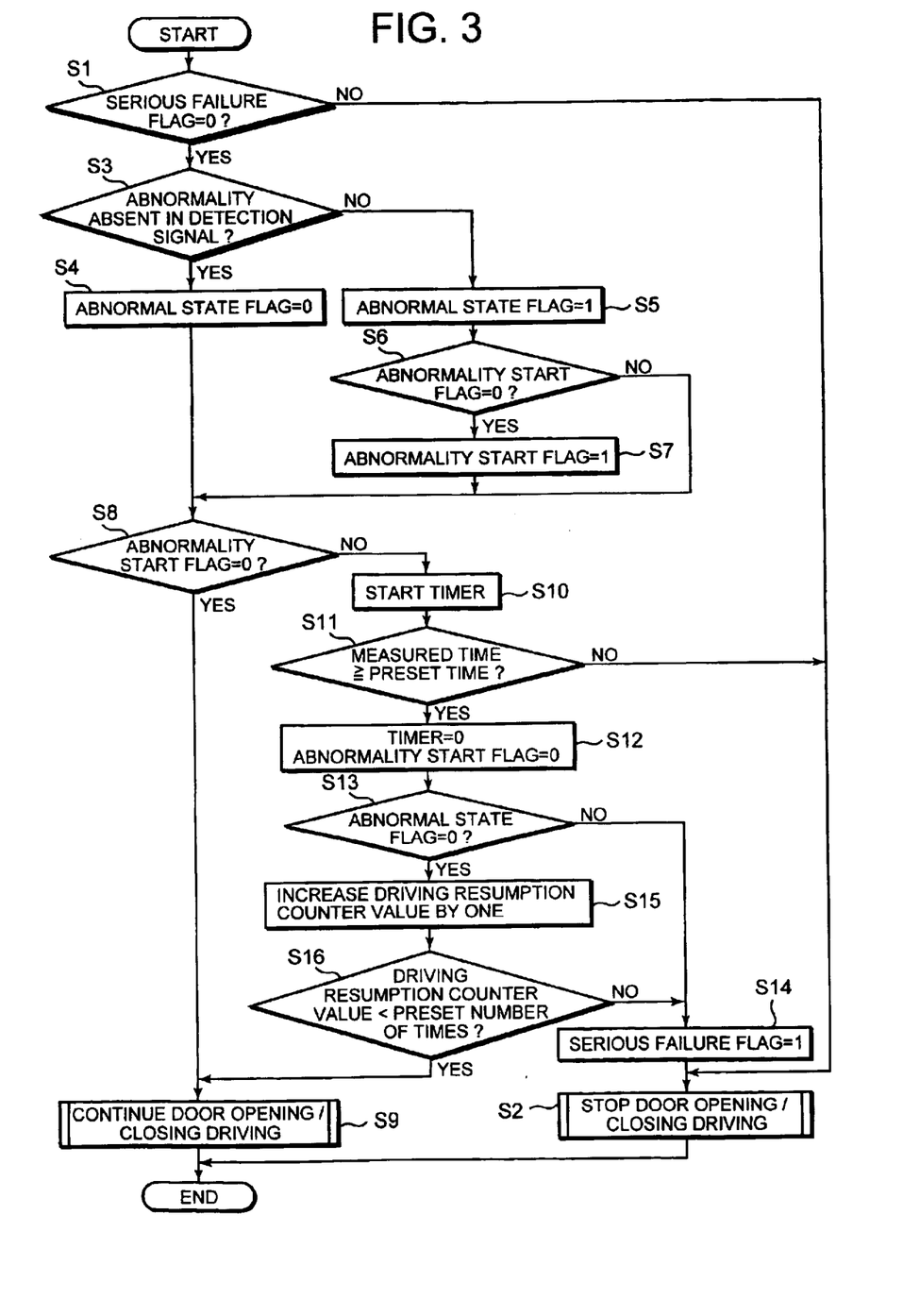
FIG. 3 is a flowchart depicting a method in accordance with another embodiment of the present invention.

Referring now to FIG. 3, a flowchart depicting operation of a vehicle door control system in accordance with another embodiment of the invention is depicted. Steps corresponding to the steps in the flowchart shown in FIG. 2 are denoted by the same reference designator and will not be described further in detail, as their operation has been described above. Therefore, only differences between the embodiment of FIG. 3 and the embodiment of FIG. 2 are described below.

Driving command calculator 9 is further provided with a driving resumption counter for counting the number of times the opening/closing driving of door 1 is resumed. At step S13, if the abnormal state flag is not set, the value of the driving resumption counter is incremented in step S15. Then, in step S16, the driving resumption counter value is compared to a predetermined threshold count value. If the count is less than the threshold, opening/closing operation of door 1 is continued in step S9. However, if the operation resumption counter value is greater than or equal to the threshold, the serious failure flag is set to "1" in step S14 and opening/closing operation of door 1 is ceased in step S2.

Therefore, according to the above-described embodiment, which can be performed within the system depicted in FIG. 1, driving command calculator 9 includes a counter that counts the number of times opening/closing operation of door 1 is resumed, and stops the opening/closing driving control when the count value reaches a predetermined threshold. If an abnormality is detected in the signal provided by position detector 5 and operation is thereby ceased for a predetermined number of times, the method and system determine that the abnormality is not a temporary malfunction of the position detection means or a certain minor transient fault but is due to a continuous failure such as disconnection of connection 13 and that damage or breakage of linear motor 2 and the devices driven thereby is possible, so opening/closing operation of door 1 is stopped. The above-described action thereby prevents such damage or breakage of the devices.

Figure 4:
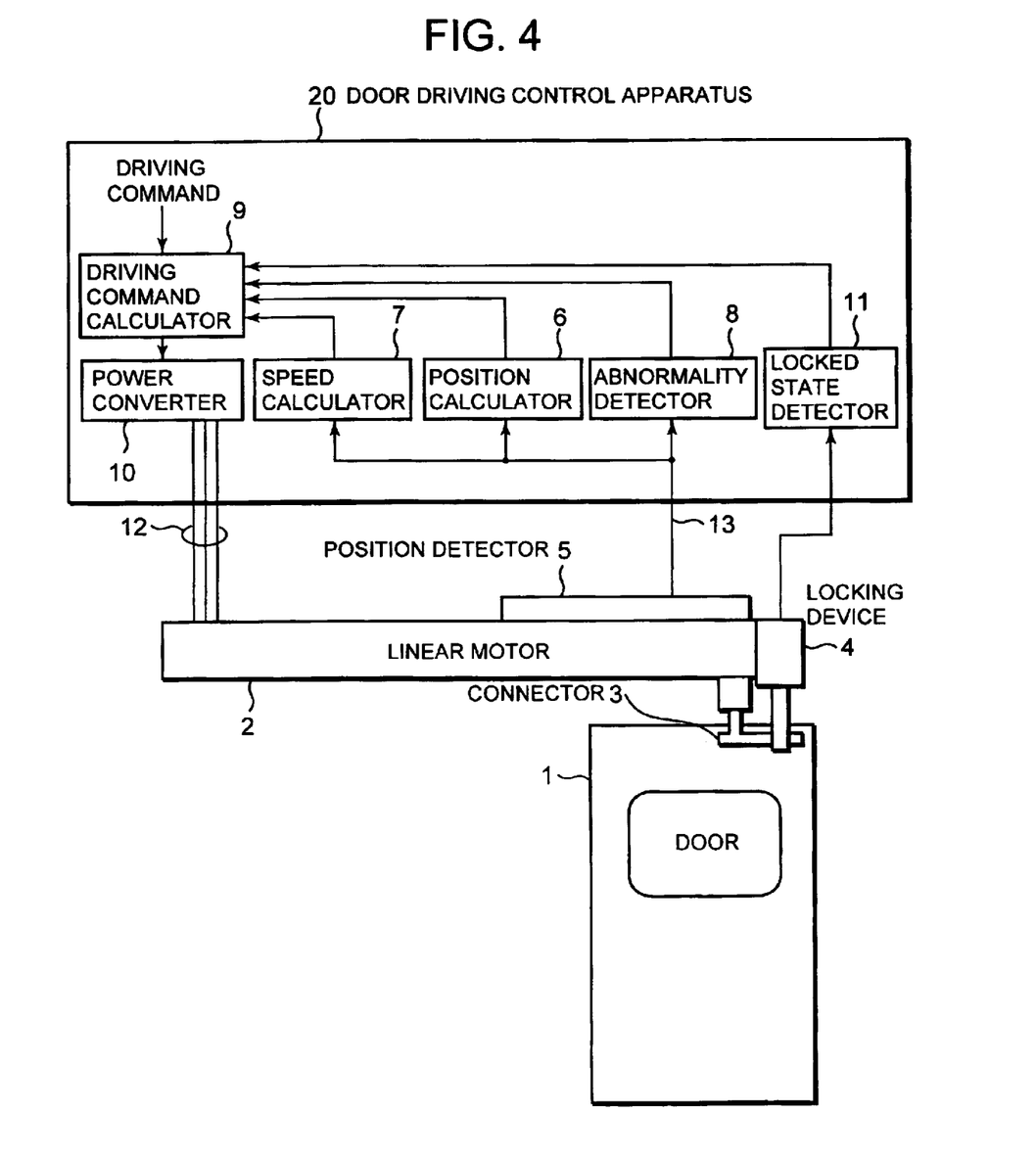
FIG. 4 is a block diagram depicting a vehicle door control system in accordance with yet another embodiment of the present invention.

Referring now to FIG. 4, a block diagram is presented depicting a vehicle door control system according to yet another embodiment of the present invention. In the embodiment shown in FIG. 4, components corresponding to the parts in the embodiment shown in FIG. 1 are denoted by the same reference numerals and operate in the same manner. Therefore the common components will not be described further in detail and only differences between the embodiments will be described.

The embodiment of FIG. 4 differs from that of FIG. 1 in that driving command calculator 9 detects that the door 1 has been brought into a locked state (e.g., mechanically fixed), by locking device 4, which is controlled by a detection signal provided by position detector 5. A locked state detector 11 for detecting the locked state of door 1 (and thereby the locked position) is provided in door driving control apparatus 20, so that driving command calculator 9 performs control as will be described hereinafter with reference to the flowchart shown in FIG. 5. The control is performed in response to the values of the locked state and the locked position as detected by the locked state detector 11.

Figure 5:
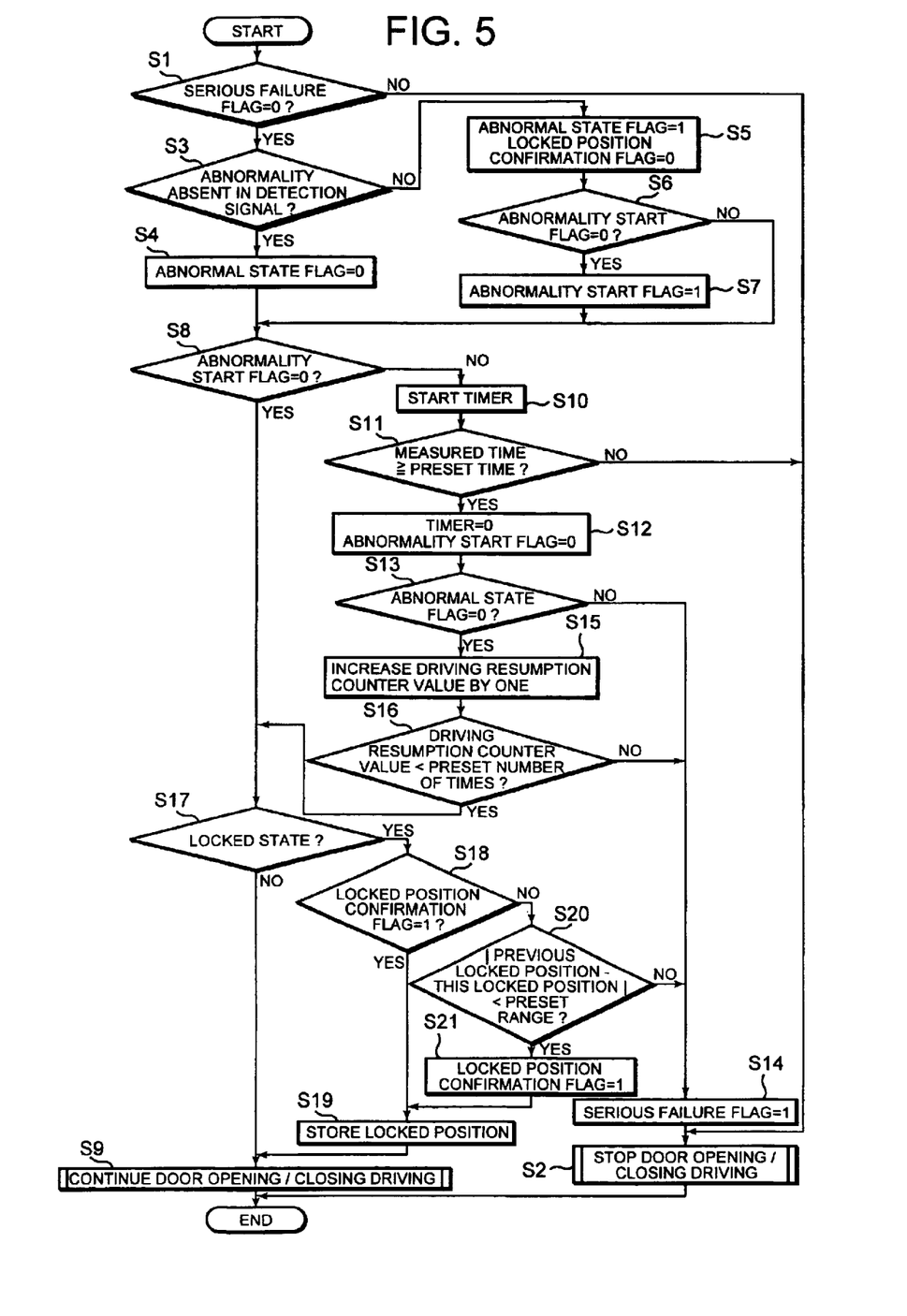
FIG. 5 is a flowchart depicting a method in accordance with yet another embodiment of the present invention.

Referring now to FIG. 5, a flowchart illustrating operation of a vehicle door control system in accordance with the embodiment depicted in FIG. 4 is depicted. Steps corresponding to the steps in the flowchart shown in FIG. 3 are denoted by the same reference designator and will not be described further in detail, as their operation has been described above. Therefore, only differences between the method illustrated in FIG. 5 and the method illustrated in FIG. 3 will be described below.

If, it is determined in step S3 that there is an abnormality indicated by abnormality detector 8, driving command calculator 9 sets the abnormal state flag to "1" and resets a locked position confirmation flag to "0" in step S5. In step S16, if the driving resumption counter value is less than the predetermined threshold, then in step S17 a determination is made whether or not a locked state of the vehicle door has been detected by locked state detector 11. If a locked state was not detected, opening/closing operation of door 1 is continued at step S9.

Otherwise, if a locked state was detected and determined in step S17, then the locked position confirmation flag is tested in step S18. If the locked position confirmation flag is "1", the locked position is stored at step S19 and the opening/closing operation of door 1 is continued at step S9. If, however the locked position confirmation flag is "0" and if, as determined in step S20, the absolute value of difference between the previously stored locked position and the locked position as presently indicated by locked state detector 11 is less than a preset range, then the locked position confirmation flag is set to "1". Otherwise, if the locked position confirmation flag was "0" in step S18, then the serious failure flag is set to "1" in step S14 and opening/closing operation of door 1 is stopped at step S2.

The above-described operation provides for proper operation when a DC offset occurs in the detection signal of position detector 5 so that the detection signal may deviate from the actual detection value. If driving command calculator 9 controls the locking of door 1 by locking device 4 in response to a deviated detection signal, the locked position will be deviated from the original proper position. If the deviation in the locked position increases or frequently occurs, door 1 and devices mechanically coupled to door 1 will be damaged or broken. Therefore, step S20 determines whether or not there is a deviation in the locked position due to a DC offset, and the opening/closing driving of the door is stopped when there is a deviation.

On the other hand, if the result of the determination in step S20 shows that the absolute value of difference is less than the preset range, there is no deviation in the locked position or the deviation is within an allowable range. Therefore, the locked position conformation flag is set to "1" at step S21 and the locked position is stored at step S19. The opening/closing operation of door 1 is continued at step S9.

Thus, the control system of FIG. 4 operating according to the method illustrated in FIG. 3 provides protection against offset or other deviation in the position detector 5 signal in order to avoid damage to door 1 or other device mechanically coupled to door 1.

As an alternative to the above described operation, driving command calculator 9 may perform the operations of step S5, setting the abnormal state flag to "1" and the locked position confirmation flag to "0", and may perform the control steps S17 to S21 after step S13 determines that the abnormal state flag is "0". The above-described alternative order can realize the same effects as those of the third embodiment, performing steps S15 and S16 after determination of any locked state, or the resumption counter steps of S15 and S16 may be omitted in accordance with another embodiment of the invention that incorporates locked position detection within the embodiment of the invention illustrated in FIG. 2.

This application claims the benefit of priority of Japanese application 2003-165424, filed on Jun. 10, 2003, the disclosure of which is incorporated herein by reference.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. An electronic control system for controlling the position of a vehicle door via control of an electric motor mechanically coupled to said vehicle door, said system comprising:

a position detector mechanically coupled to said vehicle door for detecting at least one of a position and a velocity of said vehicle door;

an abnormality detector electrically coupled to said position detector for detecting a deviation between said at least one of said position and said velocity of said vehicle door and at least one of a commanded position and a commanded velocity of said vehicle door, whereby an abnormal operation of said vehicle door is detected; and a control circuit electrically coupled to said abnormality detector and further electrically coupled to said electric motor for controlling operation of said electric motor and ceasing operation of said electric motor in response to said abnormality detector detecting said abnormal operation, said control circuit including a timer circuit for determining when a predetermined time period after said control circuit ceases operation of said electric motor, and wherein said control circuit resumes operation of said electric motor in response to both an expiration of said predetermined time period and said abnormality detector indicating that said abnormal operation has ceased.

2. The electronic control system of claim 1, wherein said control circuit further comprises a counter for counting a number of times said control circuit resumes operation of said electric motor, and wherein said control circuit further ceases resuming operation of said electric motor in response to said a count of said counter reaching a predetermined value.

3. The electronic control system of claim 2, wherein said vehicle door is further coupled to a locking device for locking said vehicle door at one or more predetermined positions, and further comprising a locked state detector electrically coupled to said control circuit for detecting that said vehicle door is locked at a first one of said predetermined positions, wherein while said counter has not reached said predetermined value, said control circuit stores an indication that said vehicle door is locked at said first one of said predetermined positions in response to said abnormality detector indicating that said vehicle door is operating normally and said control circuit calculates a difference between a second locked position detected by said locked state detector and said stored indication and ceases operation of said electric motor if a magnitude of said difference exceeds a predetermined range.

4. The electronic control system of claim 1, wherein said vehicle door is further coupled to a locking device for locking said vehicle door at one or more predetermined positions, and further comprising a locked state detector electrically coupled to said control circuit for detecting that said vehicle door is locked at a first one of said predetermined positions, wherein said control circuit stores an indication that said vehicle door is locked at said first one of said predetermined positions in response to said abnormality detector indicating that said vehicle door is operating normally, and wherein said control circuit calculates a difference between a second locked position detected by said locked state detector and said stored indication and ceases operation of said electric motor if a magnitude of said difference exceeds a predetermined range.

5. The electronic control system of claim 1, wherein said position detector detects only a position of said vehicle door.

6. The electronic control system of claim 1, wherein said position detector detects only a velocity of said vehicle door.

7. The electronic control system of claim 1, wherein said position detector detects both a position and a velocity of said vehicle door.

8. The electronic control system of claim 1, wherein said position detector is mechanically connected to said motor, whereby said at least one of said position and said velocity of said vehicle door is detected by said position detector by relating a motor position of said motor to said position of said vehicle door.

9. An electronic control system for controlling the position of a vehicle door via control of an electric motor mechanically coupled to said vehicle door, said system comprising:

means for detecting at least one of a position and a velocity of said vehicle door;

means for determining a difference between said at least one of said position and said velocity of said vehicle door and at least one of a commanded position and a commanded velocity of said vehicle door, whereby an abnormal operation of said vehicle door is detected; and control means electrically coupled to said detecting means and said determining means and further electrically coupled to said electric motor for controlling operation of said electric motor and ceasing operation of said electric motor in response to said determining means determining said abnormal operation, said control means further including means for determining when a predetermined time period after said control circuit ceases operation of said electric motor, and wherein said control circuit resumes operation of said electric motor in response to both an expiration of said predetermined time period and said determining means determining that said abnormal operation has ceased.

10. The electronic control system of claim 9, wherein said control means further comprises means for counting a number of times said control means resumes operation of said electric motor, and wherein said control means further ceases resuming operation of said electric motor in response to said number of times reaching a predetermined value.

11. The electronic control system of claim 10, wherein said vehicle door is further coupled to a locking device for locking said vehicle door at one or more predetermined positions, and further comprising a locked state detector electrically coupled to said control means for detecting that said vehicle door is locked at a first one of said predetermined positions, wherein while said number of times has not reached said predetermined value, said control means further stores an indication that said vehicle door is locked at said first one of said predetermined positions in response to said determining means indicating that said vehicle door is operating normally and said control means calculates a difference between a second locked position detected by said locked state detector and said stored indication and ceases operation of said electric motor if a magnitude of said difference exceeds a predetermined range.

12. The electronic control system of claim 9, wherein said vehicle door is further coupled to a locking device for locking said vehicle door at one or more predetermined positions, and further comprising a locked state detector electrically coupled to said control means for detecting that said vehicle door is locked at a first one of said predetermined positions, wherein while said number of times has not reached said predetermined value, said control means further stores an indication that said vehicle door is locked at said first one of said predetermined positions in response to said determining means indicating that said vehicle door is operating normally and said control means calculates a difference between a second locked position detected by said locked state detector and said stored indication and ceases operation of said electric motor if a magnitude of said difference exceeds a predetermined range.

13. A method for controlling the position of a vehicle door via control of an electric motor mechanically coupled to said vehicle door, said method comprising:

detecting at least one of a position and a velocity of said vehicle door;

first determining a difference between said at least one of said position and said velocity of said vehicle door and at least one of a commanded position and a commanded velocity of said vehicle door, whereby an abnormal operation of said vehicle door is detected; and ceasing operation of said electric motor in response to determining said abnormal operation;

second determining when a predetermined time period after performing said ceasing has elapsed;

third determining whether or not said abnormal operation has ceased; and resuming operation of said electric motor in response to said second determining that said predetermined time period has elapsed and third determining that said abnormal operation has ceased.

14. The method of claim 13, further comprising repeating said steps of detecting, first determining, ceasing, second determining, third determining and resuming.

15. The method of claim 14, further comprising:

counting a number of times said step of resuming is repeated; and ceasing said repeating in response to said number of times reaching a predetermined value.

16. The method of claim 15, further comprising:

first locking said vehicle door at a first predetermined locking position;

detecting that said vehicle door is locked at said first predetermined locking position;

in response to said number of times not reaching said predetermined value, storing an indication that said vehicle door is locked at said first predetermined locking position;

second locking said vehicle door at a second predetermined locking position;

calculating a difference between a first vehicle door position corresponding to said stored indication and said second predetermined locking position; and performing said ceasing further in response to a magnitude of said calculated difference exceeding a predetermined range.

17. The method of claim 13, further comprising:

first locking said vehicle door at a first predetermined locking position;

detecting that said vehicle door is locked at said first predetermined locking position;

in response to said number of times not reaching said predetermined value, storing an indication that said vehicle door is locked at said first predetermined locking position;

second locking said vehicle door at a second predetermined locking position;

calculating a difference between a first vehicle door position corresponding to said stored indication and said second predetermined locking position; and performing said ceasing further in response to a magnitude of said calculated difference exceeding a predetermined range.

18. The method of claim 13, wherein said detecting detects only a position of said vehicle door and said first determining determines said abnormal operation only in conformity with a difference between said position of said vehicle door and said commanded position of said vehicle door.

19. The method of claim 13, wherein said detecting detects only a velocity of said vehicle door and said first determining determines said abnormal operation only in conformity with a difference between said velocity of said vehicle door and said commanded velocity of said vehicle door.

20. The method of claim 13, wherein said detecting detects both a position and a velocity of said vehicle door and said first determining determines said abnormal operation in conformity with a difference between said position of said vehicle door and said commanded position of said vehicle door and further in conformity with a difference between said velocity of said vehicle door and said commanded velocity of said vehicle door.

* * * * *